(12) United States Patent
Bent et al.

(10) Patent No.: US 7,603,624 B2
(45) Date of Patent: Oct. 13, 2009

(54) SYSTEM AND METHOD FOR STYLING CONTENT IN A GRAPHICAL USER INTERFACE CONTROL

(75) Inventors: Samuel W. Bent, Bellevue, WA (US);
Jeffrey Lawrence Bogdan, Bellevue, WA (US); Namita Gupta, Seattle, WA (US); David Jakob Jenni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 567 days.

(21) Appl. No.: 10/971,953

(22) Filed: Oct. 21, 2004

(65) Prior Publication Data

US 2006/0090130 A1    Apr. 27, 2006

(51) Int. Cl.
*G06F 3/00* (2006.01)
*G06F 3/01* (2006.01)

(52) U.S. Cl. .................. 715/744; 715/502; 715/506; 715/763; 715/766; 717/110; 717/116; 345/619

(58) Field of Classification Search ................ 715/744, 715/763, 766, 502, 506; 717/110, 116; 345/619
See application file for complete search history.

(56) References Cited

U.S. PATENT DOCUMENTS

| | | | | |
|---|---|---|---|---|
| 6,919,891 B2 * | 7/2005 | Schneider et al. | ........... | 345/440 |
| 7,012,606 B2 * | 3/2006 | Swedberg et al. | ........... | 345/473 |
| 7,064,766 B2 * | 6/2006 | Beda et al. | ................... | 345/557 |
| 7,088,374 B2 * | 8/2006 | David et al. | ................. | 345/619 |
| 7,126,606 B2 * | 10/2006 | Beda et al. | ................... | 345/473 |
| 7,161,599 B2 * | 1/2007 | Beda et al. | ................... | 345/473 |
| 7,173,623 B2 * | 2/2007 | Calkins et al. | ............... | 345/473 |
| 7,219,340 B2 * | 5/2007 | Schechter et al. | ........... | 717/144 |
| 7,262,775 B2 * | 8/2007 | Calkins et al. | ............... | 345/473 |
| 7,265,756 B2 * | 9/2007 | Schneider et al. | ........... | 345/440 |
| 2003/0071860 A1 * | 4/2003 | Goddard et al. | ............. | 345/866 |
| 2003/0076328 A1 * | 4/2003 | Beda et al. | ................... | 345/503 |
| 2003/0076329 A1 * | 4/2003 | Beda et al. | ................... | 345/557 |
| 2003/0132937 A1 * | 7/2003 | Schneider et al. | ........... | 345/473 |
| 2004/0130550 A1 * | 7/2004 | Blanco et al. | ............... | 345/473 |
| 2004/0189645 A1 * | 9/2004 | Beda et al. | ................... | 345/473 |
| 2004/0189667 A1 * | 9/2004 | Beda et al. | ................... | 345/619 |
| 2004/0189668 A1 * | 9/2004 | Beda et al. | ................... | 345/619 |
| 2004/0189669 A1 * | 9/2004 | David et al. | ................. | 345/619 |

(Continued)

OTHER PUBLICATIONS

Stardock, DesktopX the user guide—version 2, Nov. 16, 2003, pertinent p. 12-16 and 33-40.*

*Primary Examiner*—Steven B Theriault
*Assistant Examiner*—Nicholas Augustine
(74) *Attorney, Agent, or Firm*—Workman Nydegger

(57) ABSTRACT

An improved system and method for styling content in a graphical user interface control is provided. An application may define a user interface control having a data object of any type of singular content, including another user interface control. An application may include style declarations that may associate a style resource with the user interface control and a style resource may be dynamically selected for presenting the data object of the user interface control. The style resources may define property values that may be selectively applied to specify a visual representation for the user interface control and data object, such as a visual subtree. A visual representation of the user interface control with the data object may be generated and then a display representation may be rendered for presentation on a user interface display.

38 Claims, 8 Drawing Sheets

U.S. PATENT DOCUMENTS

| | | | |
|---|---|---|---|
| 2004/0194020 A1* | 9/2004 | Beda et al. | 715/502 |
| 2004/0222992 A1* | 11/2004 | Calkins et al. | 345/473 |
| 2004/0233201 A1* | 11/2004 | Calkins et al. | 345/473 |
| 2005/0076306 A1* | 4/2005 | Martin et al. | 715/747 |
| 2005/0088436 A1* | 4/2005 | Swedberg et al. | 345/420 |
| 2005/0091637 A1* | 4/2005 | Schechter et al. | 717/110 |
| 2005/0140694 A1* | 6/2005 | Subramanian et al. | 345/619 |
| 2005/0193368 A1* | 9/2005 | Becker et al. | 717/106 |

* cited by examiner

```
namespace System.Windows.Controls
{
class ContentControl : Control
{
    public object Content {get;set;}
    public virtual void OnContentChanged(object oldContent, object newContent);

public Style ContentStyle { get; set; }
    protected virtual void OnContentStyleChanged(Style oldContentStyle, Style newContentStyle);

public static readonly DependencyProperty ContentProperty;
    public static readonly DependencyProperty ContentStyleProperty;
}
```

*FIG. 4*

```
namespace System.Windows.Controls
{
sealed class System.Windows.Controls.ContentPresenter : FrameworkElement
{
    public object Content { get; set; }
    public Style ContentStyle { get; set; }
    public StyleSelector ContentStyleSelector {get;set;}
    protected override void MeasureCore(Size constraint);
    protected override void ArrangeCore(Size arrangeBounds);
}
```

*FIG. 5*

```
Public class StyleSelector
{
    public virtual Style SelectStyle(object item, DependencyObject container);
}
```

*FIG. 6*

```
702 ──<Style>
704 ────<Button />
706 ────<Style.VisualTree>
708 ────────<ContentPresenter>
710 ────────────<Content="*Alias(Target=Content)" />
712 ────────────<ContentStyle="*Alias(Target=ContentStyle)" />
714 ────────────<ContentStyleSelector="*Alias(Target=ContentStyleSelector)" />
716 ────────<ContentPresenter />
718 ────</Style.VisualTree>
720 ──</Style>

722 ──<Style>
724 ────<Button Content="OK" />
726 ────<Style.VisualTree>
728 ────────<DockPanel>
730 ────────────<Text TextContent="Hello" />
732 ────────────<Image Source="hello.jpg"/>
734 ────────────<Border>
736 ────────────────<ContentPresenter />
738 ────────────</Border>
740 ────────</DockPanel>
742 ────</Style.VisualTree>
744 ──</Style>

746 ──<Style DataType="*typeof(Person)">
748 ────<ContentPresenter />
750 ────<Style.VisualTree>
752 ────────<Image Source="*Bind(Path=Image)"/>
754 ────</Style.VisualTree>
756 ──</Style>
```

*FIG. 7*

SYSTEM AND METHOD FOR STYLING CONTENT IN A GRAPHICAL USER INTERFACE CONTROL

FIELD OF THE INVENTION

The invention relates generally to computer systems, and more particularly to an improved system and method for styling scontent in a graphical user interface control.

BACKGROUND OF THE INVENTION

When creating a computer application, a developer typically may choose a particular environment, or platform on which the application will ultimately be executed. For example, when writing an application, the developer may choose to develop the application to run on the Microsoft Windows® platform. As a result, the program developer may have different options available for defining how user interface objects will look during interactions with a user of the application. However, an application developer may have only limited control over the user interface objects. For example, an application developer may typically change the labels of buttons, but may not be able to change their color depending upon the platform, and may not be able to change their shape, border thickness, or even their behavior.

As a result, an application developer may program the application with user interface elements provided by the platform or may create customized user interface elements by defining aspects of their appearance such as background color, font size, border thickness, and so forth, so that the chosen platform may render the display as intended by the application developer. Although functional, this process suffers certain drawbacks. For instance, in order to customize a graphical user interface control for a particular system, a developer may be required to explicitly specify the property values for how the graphical user interface control will be displayed. This may become a cumbersome and repetitive process since the customized style may only apply to one graphical user interface control and the process of customizing the style for other graphical user interface controls may need to be repeated for each graphical user interface control. Moreover, such controls traditionally only allowed their data content to be a simple string since that was the only type of data displayable for a control.

What is needed is a way for an application developer to customize the style of any type of graphical user interface control and more easily define how the content of the graphical user interface control will look during interactions with a user of the application. Such a system and method should allow a graphical user interface control to display any type of data content. Furthermore, the system and method should allow an application developer to define a customized style only once for displaying the user interface control with a certain type of data content so that the customized style may also be used for displaying other user interface controls.

SUMMARY OF THE INVENTION

Briefly, the present invention provides an improved system and method for styling content in a graphical user interface control. To this end, an application may define a user interface control having a data object of any type of singular content, including another user interface control. An application may include style declarations that may associate a style resource with the user interface control and a style resource may be dynamically selected for presenting the data object of the user interface control. The style resources may define property values that may be selectively applied to specify a visual representation for the user interface control and data object, such as a visual subtree. A styling engine may be provided for applying a style resource to a user interface control and a content presenter may be provided for dynamically selecting a style resource for presenting the data object of the user interface control. Furthermore, a property engine may be provided for locating property values, a data binding engine may be provided for binding properties of the style resource with properties on data content of the user interface control, and a tree assembler may be provided for generating a visual representation of the user interface control with the data object. Finally, a rendering engine may be provided for rendering a display representation of the visual representation for presentation on a user interface display.

The present invention also provides methods for displaying a user interface control with its data content using associated style resources. When a request is received to display a user interface control, style resources associated with the user interface control may be located and property values of the style resource may be applied to the user interface control. In applying the style resources, a visual representation of the user interface control with the applied property values may be generated. A style resource may also be dynamically assigned and applied to the data object of the user interface control. For example, a style may be dynamically selected by the content of data object, by the type of the data object, by one or more property values of the data object, and so forth. In applying the style resource, a visual representation of the data object with the applied property values may be generated. Finally, a display representation of the user interface control with the data object may then be rendered for presentation on a user interface display.

Advantageously, the present invention may associate shared style resources with several user interface controls for display. By sharing the style information, an application developer need only define the style once. Upon defining the style, the developer may declaratively associate any number of user interface controls with the defined style.

Other advantages will become apparent from the following detailed description when taken in conjunction with the drawings, in which:

BRIEF DESCRIPTION OF THE DRAWINGS

FIG. 4 presents an illustration generally representing an exemplary base class definition for a user interface control, in accordance with an aspect of the present invention;

FIG. 5 is an illustration generally representing an exemplary class definition for a control used for applying a style to a data object for display, in accordance with an aspect of the present invention;

FIG. 6 is an illustration generally representing an exemplary class definition for a style selector for selecting a style declared for a data object of a user interface control, in accordance with an aspect of the present invention;

FIG. 7 is an illustration generally representing exemplary markup language for defining a style and associating the defined style with a user interface control, in accordance with an aspect of the present invention;

DETAILED DESCRIPTION

Exemplary Operating Environment

Figure 1:
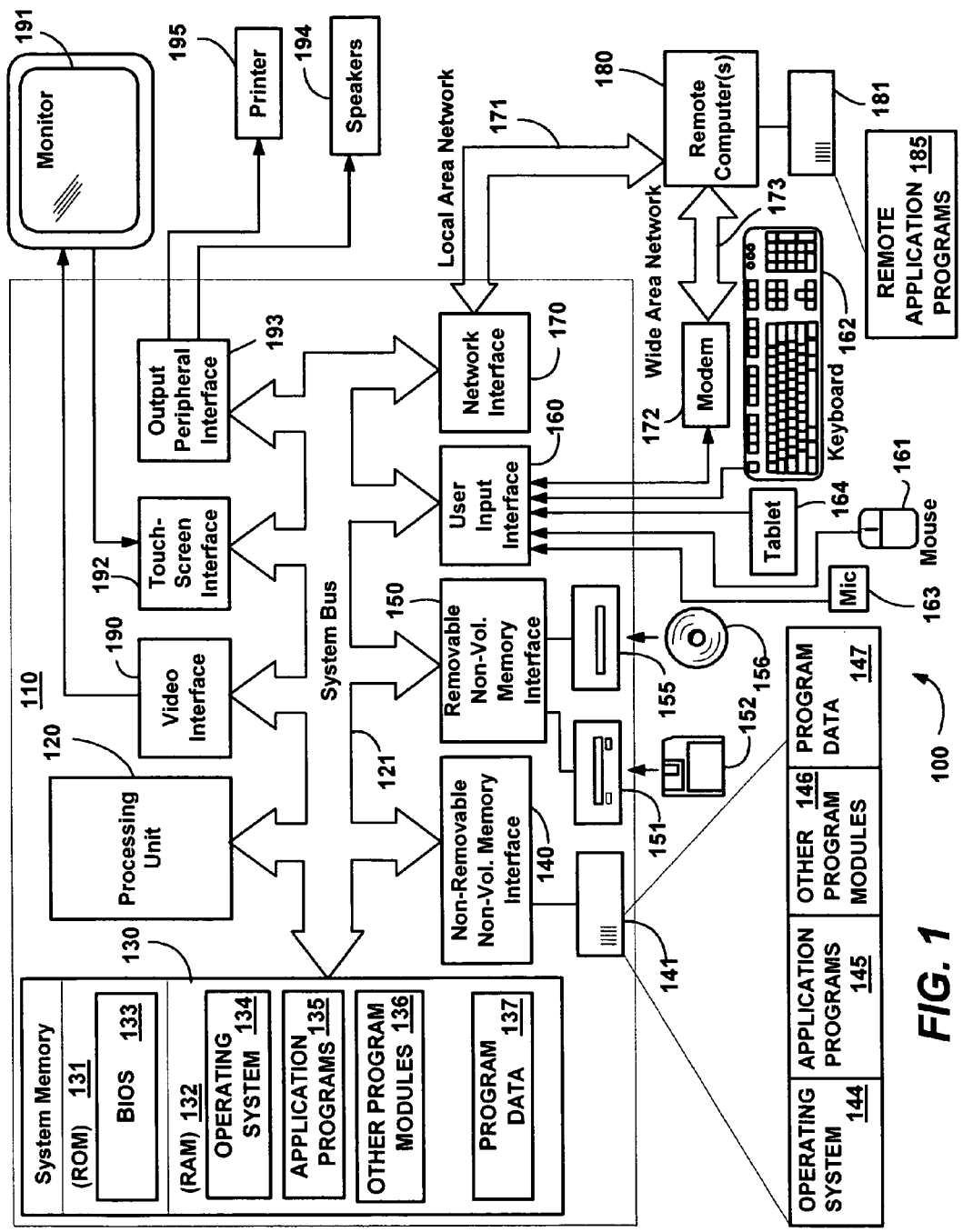
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Styling Content in a Graphical User Interface Control

The present invention is generally directed towards a system and method for styling content in a graphical user interface control. In particular, the present invention relates to providing a user interface control having a data object of any type of singular content and associating style resources with the user interface control for dynamically applying a style for displaying the data object. Moreover, the present invention may allow an application developer to define a customized style only once for displaying the user interface control with a certain type of data content so that the customized style may also be used for displaying other user interface controls with a data object.

As will be seen, the architecture of the present invention may be used for development of many different user interface controls and may support control composition for creating a control within another control. As will be understood, the various block diagrams, flow charts and scenarios described herein are only examples, and there are many other scenarios to which the present invention will apply.

Figure 2:
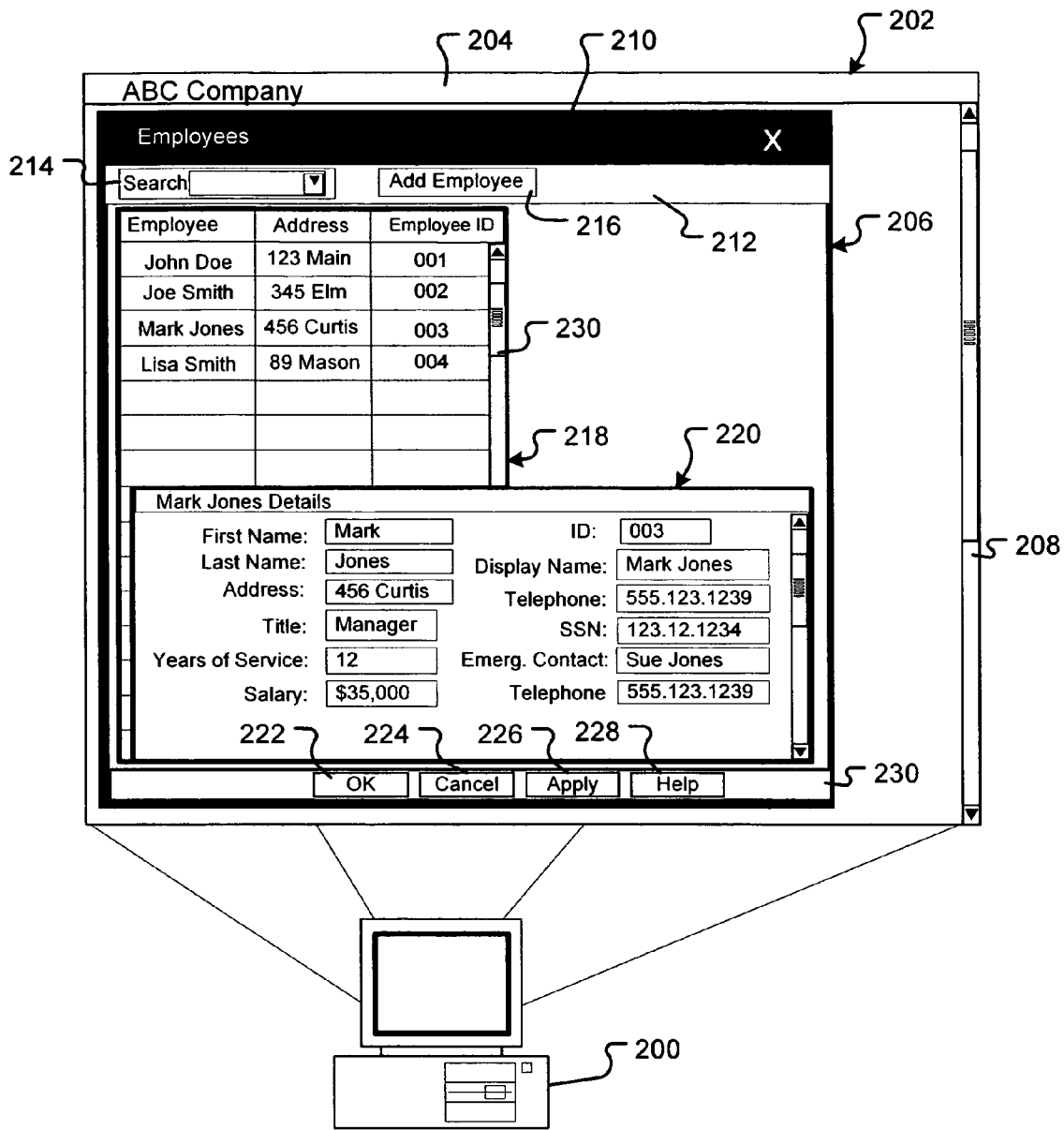
FIG. 2 is an exemplary illustration generally representing a user interface display for an application, in accordance with an aspect of the present invention.

Turning to FIG. 2 of the drawings, there is shown an exemplary illustration generally representing a user interface display for an application. The computer system 200, which may be representative of computer system 110 in FIG. 1, may render user interface elements for display on display screen 202. The display screen 202 is enlarged in FIG. 2 to show details of the display. The display 202 may relate to a display of an example company application used to manage different portions of a business, employee information for example. Those skilled in the art will appreciate that any other type of content or application may use the present invention.

In this particular example, the display 202 may have a title bar 204 and an employee window 206. There may be other windows for managing other information as indicated by scroll bar 208. Employee window 206 may have a title bar 210, a tool bar 212, and buttons 222, 224, 226, and 228 within flow panel 230. Tool bar 212 may provide user controls such as a search control 214 and an add employee control 216, among potentially many others. The user interface controls, buttons, title bars, scroll bars, tool bars and windows are generally known in the art as user interface elements. A user interface element may also be referred to as a user interface object and means, as used herein, any visual primitive used to build a graphical user interface screen including without limitation a listbox, combination box, menu, dialog box, a control, toolbar, a frame, a window, and so forth. A user interface control means any user interface element with its own graphical representation and programmed behavior for interacting with a user or the computer system in response to input such as the occurrence of specific events. A user interface control may include, for example, a button, a checkbox, a text box, a scroll bar, and so forth.

Within employee window 206, there are two sub-windows, such as employee list window 218 and employee detail window 220. In this particular example, employee window 218 displays a list of all the employees working for ABC Company. In a particular embodiment, each user interface control may be one of a group of user interface controls, such as buttons 222, 224, 226 and 228, which may be stored in a database or other data store. Each user interface control may have an associated set of properties and data content. For example, the properties for a user interface control may include a size property, a shape property, a position property, a background color property and so forth. Any type of data content may be associated with the user interface control and a specific style may also be defined to display that data content.

The present invention relates to the association of user interface controls, such as the user interface controls represented by FIG. 2 in display 202, with user interface style properties in order to provide a layout representation to a rendering engine, which in turn may create the display representation, as shown in FIG. 2. User interface controls 222, 224, 226 and 228, for example, may each be displayed using the same basic style definition that may also include a style definition for the data content associated with the user interface controls. For instance, the border thickness and background color used may be the same for each user interface control when displayed and the font size and font type used for displaying the data content may be the same. In general, defining a basic style for displaying properties of a user interface control need only be done once by a developer of an application and that style may be used for other user interface controls that are to be displayed and, significantly, that style may be used by a developer for user interface controls in any number of other applications. Furthermore, different style definitions may be created for different types of data content which may be dynamically displayed inside a user interface control.

Figure 3:
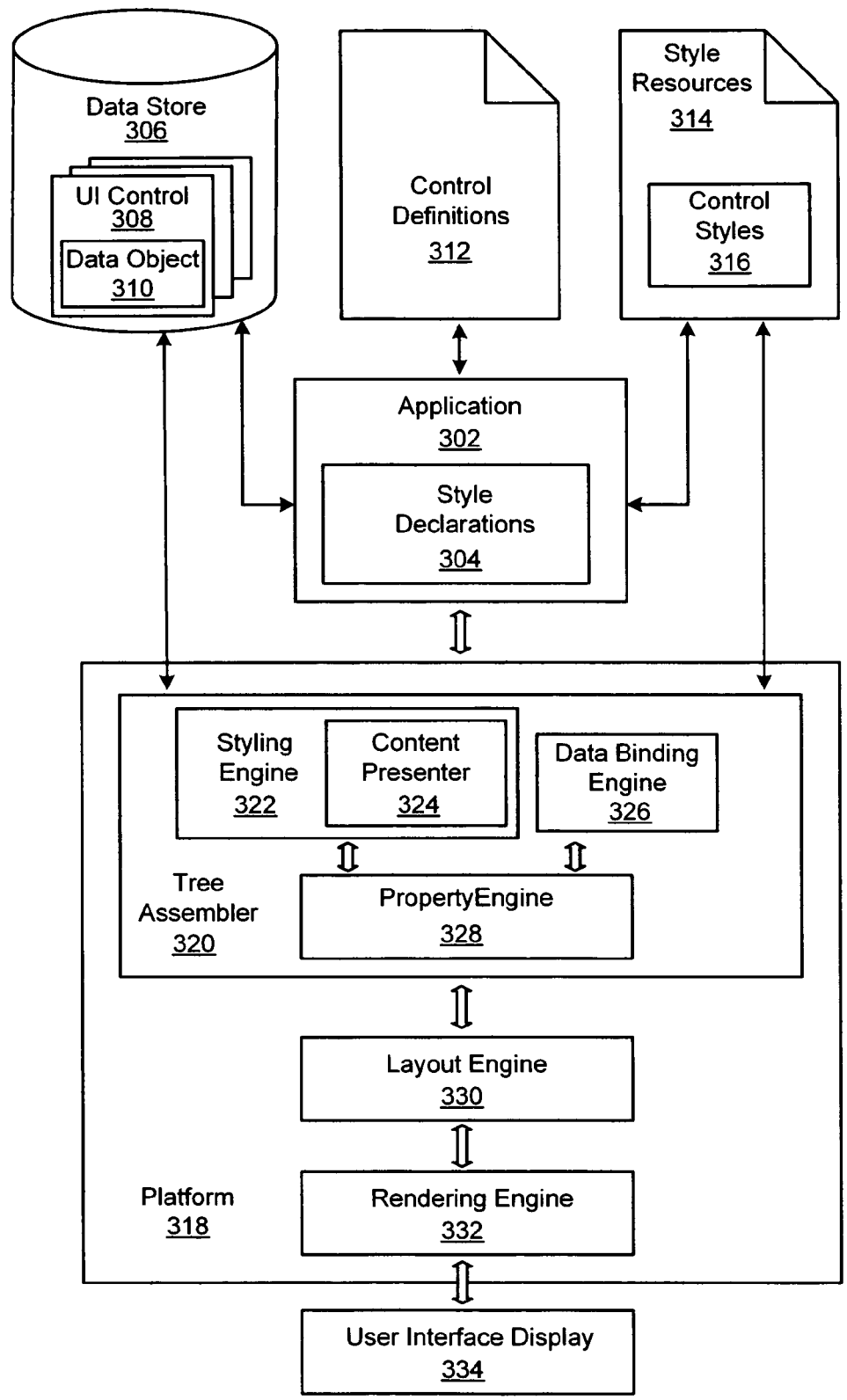
FIG. 3 is a block diagram generally representing an exemplary architecture for associating a style with one or more user interface controls for display, in accordance with an aspect of the present invention.

FIG. 3 presents a block diagram generally representing an exemplary architecture for associating a style with one or more user interface controls for display. Those skilled in the art will appreciate that the functionality implemented within the blocks illustrated in the diagram may be implemented as separate components or the functionality of several or all of the blocks may be implemented within a single component. For example, the functionality of the layout engine 330 may be included in the tree assembler 320, or the functionality of the property engine 328 may be implemented as a separate component from the tree assembler 320. In an embodiment all the components illustrated in FIG. 3 may reside and operate on a single computer system such as system 110 described in conjunction with FIG. 1. Alternatively, one or more of the components illustrated in FIG. 3 may be performed on separate computer systems in a distributed network, as is known to those skilled in the art.

An application 302 may be any executable software code including a kernel component, an application component, a linked library, an object, and so forth. Furthermore, an application 302 may be any number of different computer applications or programs developed for use on many different types of computer systems. For example, the application 302 may be an employee management application such as described in conjunction with FIG. 2. The application 302 may execute on a computer system such as computer system 110 to display controls of a user interface, among other things. In an embodiment, the application 302 may access a data store 306, which may persistently store, among other items, a plurality of user interface controls 308. Each user interface control 308 may include a data object 310 which may be any type of data content. For instance, the data object may be text, an image, a user interface element, or other type of object. Each user interface control may be defined, for instance by application 302, by using control definitions 312. Each user interface control 308 may also include associated methods and events (not shown). In accordance with embodiments of the present invention, the user interface controls may be independent of any associated style for rendering a display representation of the user interface controls.

In order to associate a style with a user interface control, the application 302 may access style resources 314. The style resources 314 may be style definitions developed or designed by the developer of the application 302 or the definitions may be created by a third party. The style definitions relate to the actual style properties to be associated with the user interface controls 308 of an application in order for the user interface controls to be ultimately displayed. Among the style resources 314, there may be control styles 316 that may be used for developing a user interface control. A control style may be stored separately from the user interface controls and may be relatively independent of the user interface controls themselves. A control style may influence the display of user interface controls in three principal ways: (1) by specifying property values for the user interface control itself, (2) by specifying an internal representation for the user interface control, such as a visual subtree, and (3) by specifying property values and an internal representation, such as a visual subtree, for the data object of the user interface control. For instance, style definitions may include user interface control properties such as the background color, the foreground color, border thickness, and so forth. The style definition may also include data object properties such as the font size (such as 12 or 10 point, etc.), font type (such as Arial or Courier, etc.), font color (such as black or red, etc.), attributes (such as bold or italics, etc.), and so forth. Also, the style definition may also describes a visual subtree to aid in the creation of an internal visual representation of the user interface controls, such as where a given user interface control should be displayed and how the data object of the user interface control should be displayed. The visual tree is discussed in more detail below.

In an embodiment, the application 302 may have style declarations that may associate properties of the style resources 314 to user interface controls 308. The style declarations 304 may provide the declarative program statement(s) that associates one or more user interface controls to a control style. Such an association may be made by explicitly identifying the data types and the data style for that type, or by providing a style selector call, or by providing a default style, or by some other method.

Application 302 may operate on platform 318. Platform 318 may include the framework or application programming interface (API) that may provide the necessary communication between the application 302 and the operating system of the computer, such as computer 110 shown in FIG. 1. As such, the platform 318 may provide the intermediate functions and services that may allow the application 302 to ultimately display user interface elements, such as user interface controls 308, on a user interface display 334. Although not shown, the operating system and its necessary operations occur between platform 318 and display 334. In a particular embodiment of the invention, the platform 318 may be the Microsoft Windows platform developed by Microsoft Corporation.

Within the platform 318, a tree assembler 320 parses the information received from the application 302 in order to build a "visual tree" which is an internal representation of the display and thus represents the combination of the data from the user interface controls 308 to be displayed and the information from the style resources 314 that describes how to display the data. The visual tree is described in more detail below in conjunction with FIG. 8. In an embodiment, the tree assembler 320 includes a styling engine 322 for locating and applying the appropriate style elements, a property engine 328 for locating the appropriate property values, and a data binding engine 326 to associate properties of a user interface elements with properties on data objects. The styling engine 322 may include a content presenter 324 for locating and applying the appropriate style elements to a data object of a user interface control. In one embodiment, the application 302 may make requests to the styling engine 322 to lookup the correct style definition, then the application 302 may make requests to the property engine 328 to lookup the appropriate property values specified by the style definition, and finally the application 302 may make requests to the data binding engine 326 to bind properties of the user interface elements with properties on data objects. These requests may be declarative, i.e., interpreted by the tree assembler 320, or procedural, i.e., the application 302 calls the binding methods at runtime. Additionally, data binding can also be performed by aliasing to create associations between properties on the elements in a visual tree and the properties of the element being styled, also referred to as the styled parent. This may allow a user of a user interface object such as a component to manipulate properties of the visual tree via direct object manipulation on the component itself. In one embodiment, the association of the properties may be stored in the style. Moreover, the control styles 316, may also have a declarative request for binding to data as well. In such a case the data binding engine 326 may handle these requests too. More details of the binding process may be found in copending U.S. patent application Ser. No. 10/440,081, titled "SYSTEM AND METHOD FOR CONTROLLING USER INTERFACE PROPERTIES WITH DATA" filed on Oct. 23, 2003, assigned to the assignee of the present application, and incorporated herein by reference for all that it discloses and teaches.

In an embodiment, the tree assembler 320 receives the user interface controls and the style information directly from the application 302. In other embodiments, the tree assembler 320 may access the required user interface controls directly from the data store 306 and the styles resources 314, respectively, through the operation of the data binding engine 326. In doing so, the tree assembler 320 understands where to look and what to find based on the style binding information received from the application's style declarations 304.

The tree assembler 320 may complete the visual tree and pass the tree to the rendering engine 332. In an embodiment, the tree may be passed relatively directly to the rendering engine 332, which, in turn may use the visual tree to render a display representation of the user interface elements on the user interface display 334. In an alternative embodiment, the visual tree may be passed first to a layout engine 330 that may add more information to the visual tree, using user interface elements from a user interface object factory to complete the tree. The layout engine, in an embodiment, may understand the physical properties of the display such that it may determine where to place certain display items and how large to make them relative to the physical characteristics of a particular computer system. The application 302 and the tree assembler 320 may typically operate in a dynamic environment whereby the tree assembler 320 may make an initial visual tree and, as the application 302 runs and display items may change, the tree assembler 320 may rewrite or modify the visual tree to update the display representation on the user interface display 334.

In one embodiment, a user interface control may be a subclass of a base class of controls which may show singular content as a data object. FIG. 4 presents an illustration generally representing an exemplary base class definition for a user interface control named ContentControl 402. ContentControl may be a control that forms a base class of controls which may have a data object of any type of singular content. For example, a button, a textbox, a checkbox and other controls which may show singular content as their data object may be instances of a subclass of ContentControl. The base class definition of ContentControl 402 may include a content object named Content 404 and a style named ContentStyle 406. The Content may be the data object which represents the singular content displayed by the user interface control. The ContentStyle may be a style having properties for displaying the data object. One way a style may be associated with a data object of a user interface control is by assigning a style to ContentStyle. This style may then by used to create a display representation of the data object in the user interface control.

Once a style has been associated with a data object of a user interface control, the style may be applied to the data object for displaying the data inside the user interface control. FIG. 5 presents an illustration generally representing an exemplary class definition for a control used for applying a style to a data object for display. The illustration shows a definition of a control named ContentPresenter 502 that may be used to apply a content style to a data object to display the data inside a user interface control. The class definition of ContentPresenter 502 may include three properties: a data object named Content 504, a style named ContentStyle 506, and a style selector named ContentStyleSelector 508. The Content property of type object may be set to any content by an application author. For instance, the content may be another control or any type of data object including a string, an XML node, an image and so forth. The ContentStyle property of type style may be set to a style for displaying the data object of the user interface control. And the ContentStyleSelector property allows an application author to program logic for dynamically providing a style for the data object. Thus, the ContentPresenter may apply the style identified by ContentStyle or returned by a call to ContentStyleSelector to the Content for displaying the data object inside a user interface control. ContentPresenter may dynamically determine a style for the type of data and apply it.

The ContentStyleSelector may select a style for a given data object. FIG. 6 presents an illustration generally representing an exemplary class definition for a style selector for selecting a style declared for a data object of a user interface control. The definition of the style selector 602 illustrated in FIG. 6 may have one method for returning a style for a data object. A subclass may override this method in order to provide logic for selecting a style dynamically for a given data object and returning the style to apply to a data object for displaying the data inside a user interface control.

A style may be considered a set of property values that may be applied to a user interface element for presenting a display representation of the user interface element. Associating a set of property values with a user interface control may be accomplished using a defined style. FIG. 7 presents an illustration generally representing exemplary markup language for defining a style and associating the defined style with a user interface control. Lines 702-720 show a style definition of a button which includes a ContentPresenter declared on line 708 that may determine how to display the data object of the button. Lines 710-714 also show the three properties of ContentPresenter: the Content, ContentStyle and ContentStyleSelector. Each of these properties may be aliased to the target type of the user interface control what is being styled which, in this example, may be the button. When a ContentControl may be created, bindings may be set up between the properties of the Content, ContentStyle and ContentStyleSelector of the ContentControl to the corresponding properties on the ContentPresenter. The ContentPresenter may then use these properties when determining which style to apply to the content of the data object in the user control. Furthermore, any changes to these properties on the ContentControl may automatically update the corresponding properties on the ContentPresenter.

Lines 722-744 show another style for a button declared at line 724 that may have a data object that is a string, namely "OK". In addition to the data object, other user interface elements are shown that may be displayed around the data object. For example, a dock panel declared on line 728 may be displayed within the button. There may be text declared on line 730 accompanied by an image declared on line 732 within the dock panel. A border declared on line 734 may surround a ContentPresenter declared on line 736 that indicates where the data object should be placed within the button.

Lines 746-756 show a third style for a user interface control having a data type of type "Person". A ContentPresenter declared on line 748 may have an image declared on line 752 to be displayed as the data object of the user interface control. In one embodiment, a user interface control may have a data context property associated with it that may provide a default data source for binding to properties of the user interface control. The ContentPresenter may likewise include a data context property that may be set to the user interface control for establishing data bindings of properties of the data object to the properties assigned to the user interface control. When the ContentPresenter may apply a style to a data object for creating a visual representation of the data object, any property values bound to values of the data object may be resolved by retrieving the corresponding values found in the visual representation for the user interface control.

Figure 8:
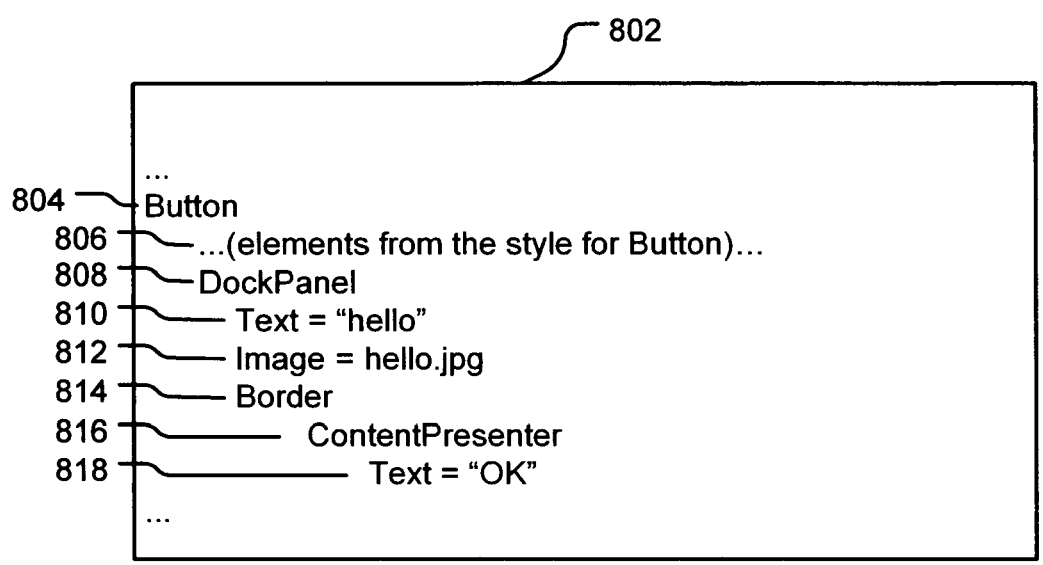
FIG. 8 is an illustration generally representing an exemplary visual tree for a user interface control, in accordance with an aspect of the present invention.

FIG. 8 presents an illustration generally representing an exemplary visual tree for a user interface control, namely a button with the style defined in lines 722-744 of FIG. 7 applied to it. A "visual tree" may be a representation in a tree-like structure having nodes for the visual representation of the user interface elements to be displayed. Not all user interface elements may be in a visual tree because not all user interface elements may have visual information. The button may be one of many user interface elements presented on a visual display, and, consequently, the visual representation for the button may be a visual subtree 802 which represents only part of a potentially larger visual tree that may include all the user interface elements presented on a visual display. In general, the tree assembler, such as tree assembler 320 shown in FIG. 3, may set the assigned property values of the button, create a copy of the visual subtree specified by the style, and add the visual subtree to the visual tree.

The first item shown in the visual subtree 802 is a button item 804. When building the tree, the tree assembler may encounter the button item declared on line 724 in FIG. 7. Upon encountering the button declaration, a node for the button item may be created to be placed in the visual subtree at position 804. Next, an inquiry may be performed to determine the style information for the button item. Such style information may include property values of the button as well as property values of the visual subtree for the button. This visual subtree might contain borders or shading information, a background color, and so forth. The tree assembler may set the properties of the button to their desired values, creates a copy of the desired visual tree, and adds it to the main visual tree at position 806.

The tree assembler may subsequently encounter the Dock Panel item declared on line 728 in FIG. 7, and a node for the Dock Panel item 808 may be created and placed in the subtree at position 808. Similarly, the tree assembler may then encounter the text item declared on line 730 in FIG. 7, the image item declared on line 732 in FIG. 7, and the border item declared on line 734 in FIG. 7. These items may be placed in the subtree at positions 810, 812 and 814 respectively. Additionally, an inquiry may be performed to determine the style information for these items and the tree assembler may set the properties of these items to their desired values.

The tree assembler may next encounter the ContentPresenter declared on line 736 in FIG. 7. In general, the ContentPresenter may serve to indicate where the data object should be displayed within the button, may determine the style for displaying the data object within the button, and may apply the style to create the visual subtree for the data object. The data object for the button may be the string "OK" which was assigned to the Content of the button in the declaration for the button on line 724. The ContentPresenter may determine to display the data object in a Text control and properties of the Text control may be aliased to corresponding properties of the ContentPresenter to control, for example, the font, foreground color, and other text properties. Whenever the layout engine may query the properties of ContentPresenter to provide a layout representation to the rendering engine, the ContentPresenter may apply the style for the data object and may expand the visual tree to include the Text control as the representation for the data object. In one embodiment, a binding may be made like that appearing in line 752 of FIG. 7 instead of the actual text so that if the data may change in the data object, the data associated with the visual tree 802 will correspondingly change.

Upon completing the visual subtree 802 and adding the visual subtree 802 to the visual tree, the visual tree may be passed to a layout engine, such as engine 330 in FIG. 3 for including additional user interface elements prior to being sent to the rendering engine 332. In another embodiment, the layout engine may call the tree assembler as needed to generate the tree just in advance of the layout process. Rendering engine 332 may render a display representation from the visual tree for presentation on a user interface display.

Figure 9:
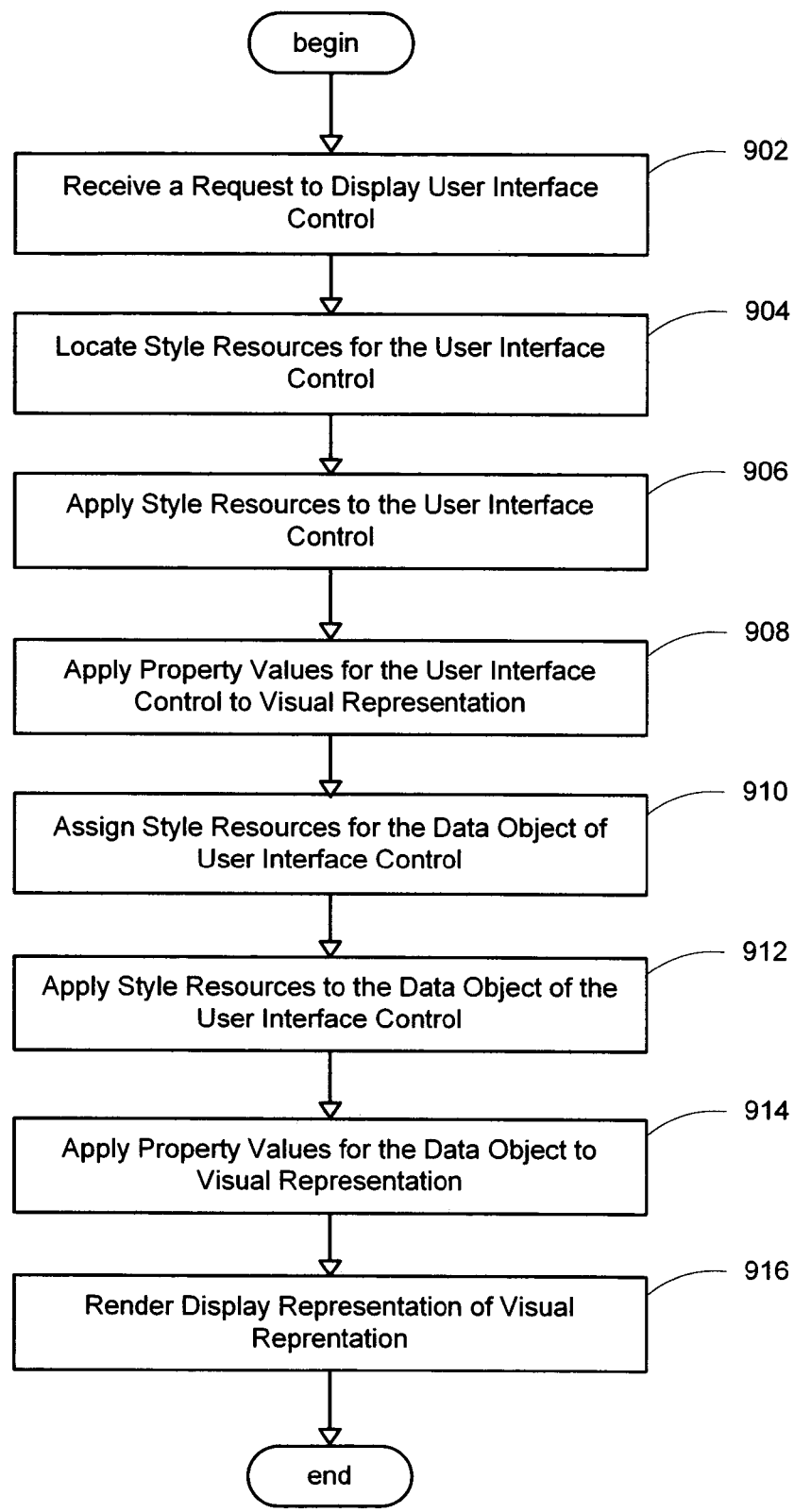
FIG. 9 is a flowchart generally representing example steps undertaken for displaying a user interface control with a data object using separate style resources, in accordance with an aspect of the present invention.

FIG. 9 presents a flowchart generally representing example steps undertaken for displaying a user interface control with a data object using separate style resources. Those skilled in the art will appreciate that an implementation may choose to perform these steps in a different order for purposes of efficiency or flexibility, while achieving the same effect and without departing from the scope of the present invention. In one embodiment, an application such as application 302 in FIG. 3 may be running on a platform, such as platform 318 in FIG. 3, which is executing on a computer system, such as computer system 110 in FIG. 1.

At step 902, a request to display a user interface control may be received. Upon receiving the request, one or more style resources associated with the user interface control may be located at step 904. To locate the style resources associated with the user interface control, a style lookup may be performed to determine whether a style was declared by the application such as in style declarations 304 of FIG. 3, or whether a default style was provided for the user interface control, or whether property values may be inherited from a parent user interface control if a style defining that property value is not found.

Upon locating the style resources associated with a user interface control, the style resources may be applied to the user interface control at step 906. In applying a style to a user interface control, any property values defined for the visual representation of the user interface control, such as a set of property values for building a visual tree, may be applied at step 908. To apply the property values defined for the visual tree, the assigned property values may be set for the user interface control, a copy of the visual subtree specified by the style may be created for the user interface control, and the visual subtree for the user interface control may be added to the visual tree. Any property values declared in the style definition using data binding may also be resolved in building the visual tree.

After applying the property values defined for the visual representation of the user interface control, a style resource may be dynamically assigned to the data object of the user interface control at step 910 and then applied at step 912. Dynamically assigning and applying a style resource to the data object of a user interface control may be described in more detail below in conjunction with FIG. 10. In applying the style resource, any property values defined for the visual representation of the data object, such as a set of property values for building a visual tree, may be applied at step 914. To apply the property values defined for the visual tree, the assigned property values may be set for the data object, a copy of the visual subtree specified by the style may be created for the data object, and the visual subtree for the data object may be added to the visual tree. Any property values declared in the style definitions using databinding may also be resolved in building the visual tree.

After applying the property values defined for the visual representation of the data object of the user interface control, a display representation of the visual representation of the user interface control with the data object may be rendered at step 916. Upon rendering the display representation, the process is finished.

Figure 10:
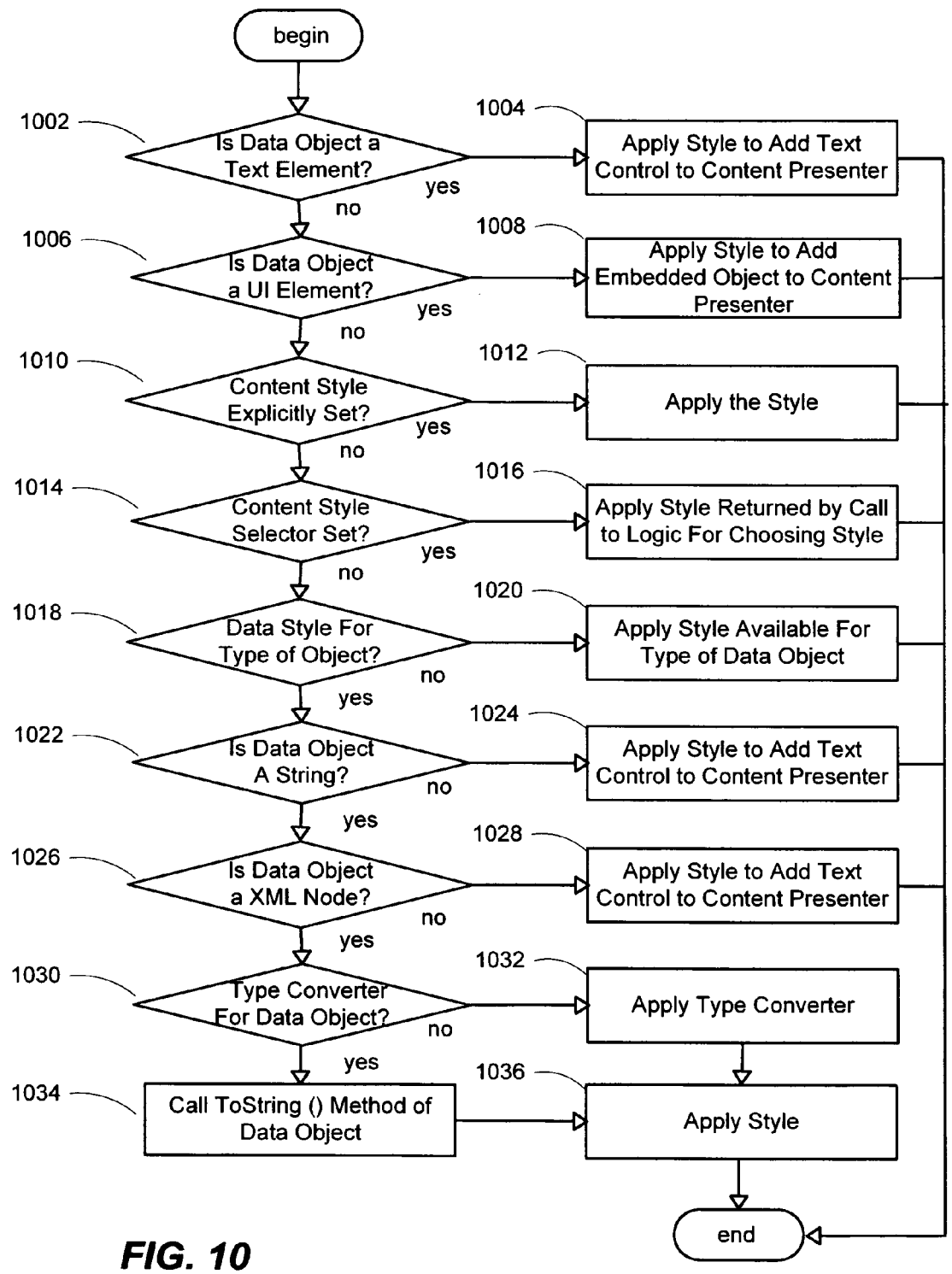
FIG. 10 is a flowchart generally representing steps undertaken in one embodiment for determining which style resource to apply to a data object of a user interface control, in accordance with an aspect of the present invention.

FIG. 10 presents a flowchart generally representing steps undertaken in one embodiment for determining which style resource to apply to a data object of a user interface control. At step 1002, it may be determined whether the content of the data object may be a text element. If so, then a style may be applied at step 1004 that may add a text control directly as a child of the ContentPresenter in the visual tree. For example, the Content property of ContentPresenter may be set to a text element, which may be a list, table, paragraph, and so forth. In addition to adding the text control as a child of the ContentPresenter in the visual tree, properties of the text control may be aliased to corresponding properties of the ContentPresenter to specify, for example, the font, foreground color, and other text properties. Moreover, if this text element had a subtree, it may be placed into the tree as a child of the text control.

If the content of the data object is not a text element, then it may be determined at step 1006 whether the content is a user interface element itself. If so, then a style may be applied at step 1008 that may add an embedded object directly as a child of the ContentPresenter in the visual tree. For example, the Content property of ContentPresenter may be set to any user interface element. In this case, the user interface element may be placed directly in the tree as an embedded object.

If the content of the data object is not a user interface element, then it may be determined at step 1010 whether the content style may be explicitly set. If so, then that style may be chosen to be applied to the data object at step 1012. For instance, the ContentStyle property of the ContentPresenter may be assigned a style such as by an application. The data context property of the ContentPresenter could be set to the user interface control for establishing data bindings of properties of the data object to the properties assigned to the user interface control.

If the content style is not explicitly set, then it may be determined at step 1014 whether the content style may be selected by using a content style selector. If so, then the style returned by a call to logic for choosing a style may be applied to the data object at step 1016. For example, the ContentStyle-Selector property of the ContentPresenter may be set, for instance, by an application. In this case, a call may be made to a method provided by an application author for returning a style for a given data object. In other embodiments, the method may be provided as part of the platform, the operating system, another application, a user library, and so forth. Thus, this mechanism may be used to dynamically select a style for a given data object. This mechanism may advantageously allow the value of the content on a button to change during the lifetime of an application. For example, sometimes the content of a button would be a person object, and at other times the content of the button would be a customer object. This mechanism may then be used to select the style that is appropriate for the person object whenever the content of the button may be the person object and this mechanism may be used to select the style that is appropriate for the customer object whenever the content of the button may be the customer object. Moreover, the style may be selected either by content, type or property values. For instance, a property value may be used directly or as part of an expression, such as if the person's age may be over thirty years old, to select a style. This mechanism provides flexibility for any logic to be used to map a content type or property value of content to a content style. Furthermore, this mechanism may provide a procedural way for an application to decide what style may be used for displaying the content of a user interface control.

If the content style is not selected by using a content style selector, then it may be determined at step 1018 whether there may be a style applicable for the type of content of the data object. If so, a style for the type of data object may be found by a data-style lookup and applied at step 1020. In one embodiment, a data-style lookup may search for a style resource that may have a type value for a style applicable to the type of the content. To do so, the data-style look up may search for style resources in an application resource dictionary or in a system resource dictionary for the type of content and also the type of base class of the content to find the most specific type of class. Such a resource dictionary may have a key, comprising the type of content and type of content presenter, and an associated style. If the data-style look up finds a key for the type of content and the type of content presenter, then that style may be used.

If a style applicable for the type of content of the data object is not found at step 1018, then it may be determined at step 1022 whether the content of the data object may be a string of characters. If so, then a style may be applied at step 1024 that may add a text control directly as a child of the ContentPresenter in the visual tree with the string assigned or aliased as content of the text control. In addition to adding the text control as a child of the ContentPresenter in the visual tree, properties of the text control may be aliased to corresponding properties of the ContentPresenter to specify, for example, the font, foreground color, and other text properties.

If the content of the data object is not a string, then it may be determined at step 1026 whether the content of the data object may be an XML node. If so, then a style may be applied at step 1028 that may add a text control directly as a child of the ContentPresenter in the visual tree with the text of the XML node assigned as content of the text control. In one embodiment, the text of the XML node may be assigned as content of the text control by binding the path of the text of the XML node to the content of the text control.

Finally, if the content of the data object is not an XML node, then it may be determined at step 1030 whether there is a type converter that may, for instance, produce a string or user interface element. If so, then a type converter may be applied at step 1032 and a style may then be applied to the content from the type converter at step 1036. For example, if the type converter produced a string, then the style may be applied as described at step 1024. In this case, a text control may be added directly as a child of the ContentPresenter in the visual tree with the string assigned or aliased as content of the text control. As another example, if the type converter produced a user interface element, then the style may be applied as described at step 1008. In this case, the user interface element may be directly added as a child of the ContentPresenter in the visual tree.

If there is not any type converter that may produce a string or a user interface element, then the ToString( ) method of the data object may be called at step 1034 which may provide a string, and then a style may be applied at step 1036 such as described at step 1024. A text control may be added directly as a child of the ContentPresenter in the visual tree with the string assigned or aliased as content of the text control. After step 1036, processing is finished for determining which style resource to apply to a data object of the user interface control.

Using the above systems and methods, an application author may provide customized styles for presenting data in a user interface control. A style may be dynamically selected for a given data object by content, type of content, or one or more property values of the data object. The present invention may thus advantageously support changing the value of the content displayed by a user interface control during the lifetime of an application. Moreover, the defined styles can be used for one or more different user interface controls. Importantly, the application author can assign style information in a declarative manner to program how a user interface control may look when displayed and how an end user might interact with the user interface control. In doing so, the style resources may be separated from the user interface control and its data object. Consequently, the author or an end user may change the style resources without changing the user interface controls. Likewise, the author may adjust the user interface controls without changing the style resources.

As can be seen from the foregoing detailed description, the present invention provides an improved system and method for styling content in a graphical user interface control. Significantly, the system and method allow a graphical user interface control to display any type of data content, including another control. Moreover, style resources may be associated with the user interface control for dynamically applying a style for displaying the data object. The architecture of the present invention may support a number of ways to provide a style for displaying the data content of a user interface control, including by type, by content, by property value, and so forth. In general, defining a basic style for displaying properties of a user interface control with a data object need only be done once by a developer of an application and that style may be used for other user interface controls that are to be displayed. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for dynamically displaying a user interface element according to a dynamically selected style based on a user-entered property value, comprising:
   one or more user interface controls that are part of a software application, the user interface controls having associated data objects of one or more different content types;
   one or more style resources having user-entered property values associated with a computer user to be assigned to the user interface control and to the data object of the user interface control, the user interface controls being dynamically updateable and separately updateable from any style resources, such that changes to the user interface controls can be made without affecting the style resources;
   a styling engine for:
      accessing at least one of a plurality of style resources, the style resources including one or more associated property values, the style resources being dynamically updateable and separately updateable from the interface controls, such that changes to the style resources can be made without affecting the user interface controls;
      accessing the one or more user-entered property values included in the request;
      dynamically selecting, based on the user-entered property values, a style resource from among the plurality of style resources associated with the user interface control, the data objects of the user interface control and the user-entered property values, the style resource corresponding to at least one of the user-entered property values associated with the computer user; and
      determining that the dynamically selected style resource corresponding to at least one of the user-entered property values is appropriate based on the content type of the data objects to which the dynamically selected style resource is to be applied, such that the dynamically selected style resource is only applied to those data objects of the user interface controls for which the dynamically selected style is determined to be appropriate; and
   a rendering engine operably coupled to the styling engine for rendering a display representation, in accordance with the dynamically selected style determined to be appropriate for the user interface control's data object's content type, of the user interface control with the data object for presentation on a user interface display, the user interface control and the data object each including the dynamically selected style resource corresponding to the user-entered property value, the rendering engine being configured to perform the following:
      receiving a second request to apply one or more changes to the user interface controls of the software application; and
      while the software application is running, dynamically re-rendering the display representation to include the indicated changes to the user interface controls without affecting the changes made by the dynamically selected style resources, wherein the user interface controls and the style resources are each separately updatable without affecting each other.

2. The system of claim 1 further comprising a tree assembler operably coupled to the styling engine for generating a visual representation of the user interface control with the applied property values of the one or more style resources and for generating a visual representation of the data object with the applied property values of the one or more style resources.

3. The system of claim 1 further comprising an application operably coupled to control definitions used for declaring the user interface control having the data object of any type of singular content.

4. The system of claim 1 further comprising an application operably coupled to the one or more style resources and to the user interface control, the application having style declarations for associating the one or more style resources with the user interface control and for associating the one or more style resources with the data object of the user interface control.

5. The system of claim 1 further comprising a content presenter operably coupled to the styling engine for dynamically assigning a style resource of the one or more style resources to the data object of the user interface control.

6. The system of claim 1 further comprising a property engine operably coupled to the styling engine for locating the property values.

7. The system of claim 1 further comprising a data binding engine operably coupled to the styling engine for binding the property values to the user interface control and to the data object of the user interface control.

8. The system of claim 2 further comprising a layout engine operably coupled to the tree assembler for generating a layout of the user interface control with the applied property values of the one or more style resources and for generating a layout of the data object of the user interface control with the applied property values of the one or more style resources.

9. The system of claim 1 further comprising a user interface display operably coupled to the rendering engine for displaying the display representation.

10. The system of claim 1 wherein the one or more styling resources comprises a control style.

11. A computer-readable storage medium having computer-executable components comprising the system of claim 1.

12. A method for dynamically rendering one or more user interface elements for display in a computer system according to a dynamically selected style based on a user-entered property value, comprising:

receiving a request to display one or more user interface controls that are part of a software application, the user interface controls having associated data objects of one or more different content types, the request including one or more user-entered property values associated with a computer user, the user interface controls being dynamically updateable and separately updateable from any style resources, such that changes to the user interface controls can be made without affecting the style resources;

accessing at least one of a plurality of style resources, the style resources including one or more associated property values, the style resources being dynamically updateable and separately updateable from the interface controls, such that changes to the style resources can be made without affecting the user interface controls;

accessing the one or more user-entered property values included in the request;

dynamically selecting, based on the user-entered property values, a style resource from among the plurality of style resources associated with the user interface control, the data objects of the user interface control and the user-entered property values, the style resource corresponding to at least one of the user-entered property values associated with the computer user;

determining that the dynamically selected style resource corresponding to at least one of the user-entered property values is appropriate based on the content type of the data objects to which the dynamically selected style resource is to be applied, such that the dynamically selected style resource is only applied to those data objects of the user interface controls for which the dynamically selected style is determined to be appropriate;

rendering a display representation, in accordance with the dynamically selected style determined to be appropriate for the user interface control's data object's content type, of the user interface control with the data object for presentation on a user interface display, the user interface control and the data object each including the dynamically selected style resource corresponding to the user-entered property value;

receiving a second request to apply one or more changes to the user interface controls of the software application; and while the software application is running, dynamically re-rendering the display representation to include the indicated changes to the user interface controls without affecting the changes made by the dynamically selected style resources, wherein the user interface controls and the style resources are each separately updatable without affecting each other.

13. The method of claim 12 further comprising associating the style resource with the user interface control.

14. The method of claim 13 wherein associating the style resources with the user interface control comprises providing a style declaration assigning the style resource to the user interface control.

15. The method of claim 12 further comprising binding property values of the user interface control to the corresponding property values of a content presenter.

16. The method of claim 12 further comprising binding the property values in the visual representation with properties on the data object of the user interface control.

17. The method of claim 12 further comprising generating a layout of the user interface control with the applied property values of the style resource.

18. The method of claim 12 further comprising generating a layout of the data object with the applied property values of the style resource.

19. The method of claim 12 further comprising displaying the display representation on the user interface display.

20. The method of claim 12 further comprising providing declarations that define a second style resource with property values to be selectively applied to the data object of the user interface control.

21. The method of claim 20 wherein providing declarations that define the second style resource with property values to be selectively applied to the data object comprises providing a declaration explicitly specifying the style to be applied to the data object.

22. The method of claim 20 wherein providing declarations that define the second style resource with property values to be selectively applied to the data object comprises providing a declaration specifying a call to executable code provided by the application to dynamically select the style to be applied to the data object.

23. The method of claim 20 wherein providing declarations that define the second style resource with property values to be selectively applied to the data object comprises providing a declaration specifying the type of data object for which a style may be dynamically selected that may apply to the type of the data object.

24. A computer-readable storage medium having computer-executable instructions for performing the method of claim 12.

25. A computer system for dynamically displaying a user interface object according to a dynamically selected style based on a user-entered property value, the system comprising:

means for receiving a request to display one or more user interface controls that are part of a software application, the user interface controls having associated data objects of one or more different content types, the request including one or more user-entered property values associated with a computer user, the user interface controls being dynamically updateable and separately updateable from any style resources, such that changes to the user interface controls can be made without affecting the style resources;

means for accessing at least one of a plurality of style resources, the style resources including one or more associated property values, the style resources being dynamically updateable and separately updateable from the interface controls, such that changes to the style resources can be made without affecting the user interface controls;

means for accessing the one or more user-entered property values included in the request;

means for dynamically selecting, based on the user-entered property values, a style resource from among the plurality of style resources associated with the user interface control, the data objects of the user interface control and the user-entered property values, the style resource corresponding to at least one of the user-entered property values associated with the computer user, wherein the control comprises a text control, the text being received from a file path to an indicated XML node;

means for determining that the dynamically selected style resource corresponding to at least one of the user-entered property values is appropriate based on the content type of the data objects to which the dynamically selected style resource is to be applied, such that the dynamically selected style resource is only applied to those data objects of the user interface controls for which the dynamically selected style is determined to be appropriate;

means for rendering a display representation, in accordance with the dynamically selected style determined to be appropriate for the user interface control's data object's content type, of the user interface control with the data object for presentation on a user interface display, the user interface control and the data object each including the dynamically selected style resource corresponding to the user-entered property value;

means for receiving a second request to apply one or more changes to the user interface controls of the software application; and means for dynamically re-rendering the display representation while the software application is running to include the indicated changes to the user interface controls without affecting the changes made by the dynamically selected style resources, wherein the user interface controls and the style resources are each separately updatable without affecting each other.

26. The system of claim 25 further comprising means for assigning the style resource associated with the user interface control.

27. The system of claim 25 further comprising means for assigning the style resource associated with the data object of the user interface control.

28. The system of claim 25 further comprising means for locating the style resource provided for the data object of the user interface control.

29. The system of claim 25 further comprising means for generating a visual representation of the user interface control with the data object.

30. The method of claim 25 further comprising means for displaying the display representation on the user interface display.

31. The method of claim 12, further comprising searching an application resource library for style resources that have at least one style appropriate for the user interface control's content type.

32. The method of claim 31, wherein the application resource library comprises one or more keys, each key corresponding to a type of content, a type of content presenter and an associated style.

33. The method of claim 32, wherein determining that the dynamically selected style resource is appropriate based on the content type for the user interface control comprises determining that the search found a key corresponding to the user interface control's content type and the type of content presenter.

34. The method of claim 31, wherein searching for the style resource further comprises searching for a base class for the content type.

35. The method of claim 12, further comprising determining the physical characteristics of the computer system display on which the user interface controls are displayed.

36. The method of claim 35, further comprising dynamically modifying the rendering of the display representation based on the determined physical characteristics of the display on which the user interface controls are displayed.

37. The method of claim 36, wherein the screen position of at least one of the user interface controls is altered based on the determined physical characteristics of the display.

38. The method of claim 37, wherein the size of at least one of the user interface controls is altered based on the determined physical characteristics of the display.

* * * * *